(12) United States Patent (10) Patent No.: US 12,659,069 B2

Roberts et al. (45) Date of Patent: Jun. 16, 2026

(54) ORBITAL ANGULAR MOMENTUM SPLITTING WITH VOLUMETRIC META-OPTICS

(71) Applicant: California Institute of Technology, Pasadena, CA (US)

(72) Inventors: Gregory D. Roberts, Alhambra, CA (US); Andrei Faraon, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 412 days.

(21) Appl. No.: 18/346,061

(22) Filed: Jun. 30, 2023

(65) Prior Publication Data

US 2024/0031052 A1 Jan. 25, 2024

Related U.S. Application Data

(60) Provisional application No. 63/391,411, filed on Jul. 22, 2022.

(51) Int. Cl.
| | |
|---|---|
| *H04J 14/00* | (2006.01) |
| *H04J 14/04* | (2006.01) |
| *H04B 10/25* | (2013.01) |
| *H04B 10/2581* | (2013.01) |

(52) U.S. Cl.
CPC .............. *H04J 14/07* (2023.08); *H04J 14/04* (2013.01); *H04B 10/25* (2013.01); *H04B 10/2581* (2013.01); *H04J 14/00* (2013.01)

(58) Field of Classification Search
CPC . H04J 14/07; H04J 14/04; H04J 14/00; H04B 10/25; H04B 10/2581

USPC .................. 398/43–103, 140–172, 202–214
See application file for complete search history.

(56) References Cited

U.S. PATENT DOCUMENTS

| | | | |
|---|---|---|---|
| 3,971,065 | A | 7/1976 | Bayer |
| 5,385,114 | A | 1/1995 | Milstein et al. |
| 5,438,414 | A | 8/1995 | Rust |
| 6,991,334 | B2 | 1/2006 | Okuyama et al. |

(Continued)

FOREIGN PATENT DOCUMENTS

| | | |
|---|---|---|
| CN | 1635662 A | 7/2005 |
| CN | 101044631 A | 9/2007 |

(Continued)

OTHER PUBLICATIONS

Lightman et al, Exploring for New Insights in the Performance of a 3D Orbital Angular Momentum Mode-Sorter, Mar. 2022, Frontiers in Physics, vol. 10, All Document. (Year: 2022).*

(Continued)

*Primary Examiner* — Dibson J Sanchez

(74) *Attorney, Agent, or Firm* — Steinfl + Bruno LLP

(57) ABSTRACT

Methods and devices to split electromagnetic waves across broad bandwidths in correspondence with orbital angular momentum states combined with orthogonal polarization states are disclosed. The described methods can be used in fiber communication and imaging systems. The devices include three-dimensional (3D) scattering structures that can be using existing CMOS processes and direct write lithography techniques. Performance metrics based on the intensity and contrast of the split electromagnetic waves are also disclosed.

15 Claims, 8 Drawing Sheets

(56) References Cited

U.S. PATENT DOCUMENTS

| | | |
|---|---|---|
| 7,408,712 B2 | 8/2008 | Ruoff et al. |
| 7,864,114 B2 | 1/2011 | Sanada |
| 7,903,530 B2 | 3/2011 | Kim |
| 7,911,386 B1 | 3/2011 | Itoh et al. |
| 8,002,998 B2 | 8/2011 | Iwata et al. |
| 9,159,761 B2 | 10/2015 | Kokubun |
| 9,170,358 B2 | 10/2015 | Chen |
| 9,207,357 B2 | 12/2015 | Steinhardt et al. |
| 9,254,089 B2 | 2/2016 | Tearney et al. |
| 9,739,918 B2 | 8/2017 | Arbabi et al. |
| 11,057,116 B1 | 7/2021 | Buck, Jr. |
| 11,239,276 B2 | 2/2022 | Roberts et al. |
| 11,397,331 B2 | 7/2022 | Camayd-Munoz et al. |
| 11,604,364 B2 | 3/2023 | Rubin et al. |
| 11,650,428 B2 | 5/2023 | Wang et al. |
| 11,841,520 B2 | 12/2023 | Ellenbogen et al. |
| 11,874,476 B1 | 1/2024 | Kress et al. |
| 12,135,433 B2 | 11/2024 | Rubin et al. |
| 12,198,300 B2 | 1/2025 | Yang et al. |
| 12,216,290 B2 | 2/2025 | Camayd-Munoz et al. |
| 12,237,094 B2 | 2/2025 | Zheng et al. |
| 12,320,988 B2 | 6/2025 | Roberts et al. |
| 12,339,430 B2 | 6/2025 | Liang et al. |
| 12,416,752 B2 | 9/2025 | Rubin et al. |
| 2002/0057431 A1 | 5/2002 | Fateley et al. |
| 2003/0028114 A1 | 2/2003 | Casscells, III et al. |
| 2003/0082105 A1 | 5/2003 | Fischman et al. |
| 2003/0118799 A1 | 6/2003 | Miller et al. |
| 2003/0210396 A1 | 11/2003 | Hobbs et al. |
| 2004/0184006 A1 | 9/2004 | Okuyama et al. |
| 2005/0234220 A1 | 10/2005 | Koga et al. |
| 2005/0237134 A1 | 10/2005 | Furuya et al. |
| 2006/0057707 A1 | 3/2006 | Cunningham et al. |
| 2006/0113622 A1 | 6/2006 | Adkisson et al. |
| 2007/0019306 A1 | 1/2007 | Wu et al. |
| 2007/0229955 A1 | 10/2007 | Kawamura et al. |
| 2007/0233396 A1 | 10/2007 | Tearney et al. |
| 2008/0013960 A1 | 1/2008 | Tearney et al. |
| 2008/0047928 A1 | 2/2008 | Iwata et al. |
| 2008/0157140 A1 | 7/2008 | Cho |
| 2008/0161194 A1 | 7/2008 | Turner et al. |
| 2009/0052019 A1 | 2/2009 | Brueck et al. |
| 2009/0250110 A1 | 10/2009 | Yu et al. |
| 2009/0276188 A1 | 11/2009 | Cui et al. |
| 2010/0033818 A1 | 2/2010 | Petcavich et al. |
| 2010/0107693 A1 | 5/2010 | Rajala et al. |
| 2010/0148283 A1 | 6/2010 | Shih |
| 2010/0149617 A1 | 6/2010 | Kroll et al. |
| 2010/0264295 A1 | 10/2010 | Van Dijk et al. |
| 2010/0302481 A1 | 12/2010 | Baum et al. |
| 2010/0309457 A1 | 12/2010 | Cui et al. |
| 2011/0069377 A1 | 3/2011 | Wu et al. |
| 2011/0237892 A1 | 9/2011 | Tearney et al. |
| 2011/0285942 A1 | 11/2011 | Guo et al. |
| 2012/0013989 A1 | 1/2012 | Choi et al. |
| 2012/0082863 A1 | 4/2012 | Ohta et al. |
| 2012/0092770 A1 | 4/2012 | Li et al. |
| 2012/0194912 A1 | 8/2012 | Faraon et al. |
| 2012/0268809 A1 | 10/2012 | Guo et al. |
| 2013/0099343 A1 | 4/2013 | Toshikiyo et al. |
| 2013/0141190 A1 | 6/2013 | Kitaoka et al. |
| 2013/0208360 A1 | 8/2013 | Coggio et al. |
| 2014/0078514 A1* | 3/2014 | Zhu ........................ G01B 11/24 |
| | | 356/606 |
| 2014/0092373 A1 | 4/2014 | Tabirian et al. |
| 2014/0146390 A1 | 5/2014 | Kaempfe et al. |
| 2014/0226190 A1 | 8/2014 | Bridges et al. |
| 2014/0270374 A1 | 9/2014 | Unzueta |
| 2014/0293467 A1 | 10/2014 | Palikaras et al. |
| 2014/0339606 A1 | 11/2014 | Lin et al. |
| 2014/0340732 A1 | 11/2014 | Zhang et al. |
| 2015/0198812 A1 | 7/2015 | Gaylord et al. |
| 2015/0349910 A1* | 12/2015 | Huang ................... H04J 14/07 |
| | | 398/44 |
| 2016/0012176 A1* | 1/2016 | Liu ........................ G02B 6/107 |
| | | 716/112 |
| 2016/0025914 A1 | 1/2016 | Brongersma et al. |
| 2016/0043794 A1* | 2/2016 | Ashrafi ................ H04B 7/0617 |
| | | 370/329 |
| 2016/0054172 A1 | 2/2016 | Roh et al. |
| 2016/0077261 A1 | 3/2016 | Arbabi et al. |
| 2016/0109381 A1 | 4/2016 | Pavani |
| 2016/0202283 A1* | 7/2016 | Wang ................... G01S 7/4814 |
| | | 356/28 |
| 2016/0206184 A1 | 7/2016 | Tearney et al. |
| 2017/0069678 A1 | 3/2017 | Cheng et al. |
| 2017/0146856 A1 | 5/2017 | Yokota |
| 2017/0201324 A1 | 7/2017 | Wang |
| 2017/0372866 A1 | 12/2017 | McMorran et al. |
| 2017/0373700 A1 | 12/2017 | Lu et al. |
| 2018/0045953 A1 | 2/2018 | Fan et al. |
| 2018/0348511 A1 | 12/2018 | Arbabi et al. |
| 2019/0064532 A1 | 2/2019 | Riley, Jr. et al. |
| 2019/0173191 A1 | 6/2019 | Kamali et al. |
| 2019/0178714 A1 | 6/2019 | Faraji-Dana et al. |
| 2019/0191144 A1 | 6/2019 | Arbabi et al. |
| 2019/0215069 A1* | 7/2019 | Romanato ............ G02B 6/2848 |
| 2019/0253176 A1* | 8/2019 | Liu ................... H04B 10/6164 |
| 2020/0014465 A1* | 1/2020 | Okamoto ............. H04B 10/548 |
| 2020/0124866 A1 | 4/2020 | Camayd-Munoz et al. |
| 2020/0348500 A1 | 11/2020 | Kwon et al. |
| 2020/0356890 A1 | 11/2020 | Ashrafi |
| 2021/0118938 A1 | 4/2021 | Roberts et al. |
| 2021/0266088 A1* | 8/2021 | Lu ........................ H04J 14/0307 |
| 2021/0286188 A1 | 9/2021 | Rubin et al. |
| 2022/0214219 A1 | 7/2022 | Faraon et al. |
| 2022/0385360 A1* | 12/2022 | Lee ........................ H04B 10/11 |
| 2023/0054228 A1* | 2/2023 | Capasso .............. G02B 6/2817 |
| 2023/0122182 A1 | 4/2023 | Camayd-Munoz et al. |
| 2023/0207592 A1 | 6/2023 | Watanabe et al. |
| 2024/0031052 A1 | 1/2024 | Roberts et al. |
| 2024/0369738 A1 | 11/2024 | Wang et al. |
| 2024/0426660 A1 | 12/2024 | Chattopadhyay et al. |
| 2025/0164669 A1 | 5/2025 | Arbabi et al. |
| 2025/0164851 A1* | 5/2025 | Johnson ................... G02F 1/33 |
| 2025/0199472 A1 | 6/2025 | Lei et al. |

FOREIGN PATENT DOCUMENTS

| | | |
|---|---|---|
| CN | 101720447 A | 6/2010 |
| CN | 101868713 A | 10/2010 |
| CN | 102870018 A | 1/2013 |
| CN | 102981205 A | 3/2013 |
| CN | 103048723 A | 4/2013 |
| CN | 103154777 A | 6/2013 |
| CN | 103364955 A | 10/2013 |
| CN | 103399369 A | 11/2013 |
| CN | 204481029 U | 7/2015 |
| CN | 107076884 A | 8/2017 |
| CN | 107664780 A | 2/2018 |
| CN | 109545812 A | 3/2019 |
| CN | 107076884 B | 3/2020 |
| CN | 111684581 A | 9/2020 |
| CN | 113167938 A | 7/2021 |
| CN | 114556166 A | 5/2022 |
| CN | 116344564 A | 6/2023 |
| EP | 3195048 A1 | 7/2017 |
| EP | 3871020 A2 | 9/2021 |
| JP | 2004219998 A | 8/2004 |
| JP | 2004233910 A | 8/2004 |
| JP | 2005084290 A | 3/2005 |
| JP | 2006049902 A | 2/2006 |
| JP | 2006245926 A | 9/2006 |
| JP | 2008052108 A | 3/2008 |
| JP | 2008185799 A | 8/2008 |
| JP | 2009510391 A | 3/2009 |
| JP | 2009223074 A | 10/2009 |
| JP | 2011527930 A | 11/2011 |
| JP | 2011530403 A | 12/2011 |
| JP | 2012015424 A | 1/2012 |
| JP | 2012027172 A | 2/2012 |
| JP | 2012058437 A | 3/2012 |
| JP | 2012058673 A | 3/2012 |

(56) References Cited

FOREIGN PATENT DOCUMENTS

| | | | |
|---|---|---|---|
| JP | 2012078541 A | 4/2012 |
| JP | 2012510637 A | 5/2012 |
| JP | 2012530945 A | 12/2012 |
| JP | 2013505479 A | 2/2013 |
| JP | 2013109349 A | 6/2013 |
| JP | 2014534459 A | 12/2014 |
| JP | 2015087431 A | 5/2015 |
| JP | 2015194637 A | 11/2015 |
| JP | 2017527857 A | 9/2017 |
| JP | 2017538974 A | 12/2017 |
| JP | 2021012376 A | 2/2021 |
| JP | 2021521481 A | 8/2021 |
| JP | 2022503657 A | 1/2022 |
| JP | 7069265 B2 | 5/2022 |
| JP | 2022110029 A | 7/2022 |
| KR | 20080061029 A | 7/2008 |
| KR | 20210064240 A | 6/2021 |
| KR | 20220083736 A | 6/2022 |
| TW | 201140141 A | 11/2011 |
| WO | 2004/059784 A1 | 7/2004 |
| WO | 2007/008440 A2 | 1/2007 |
| WO | 2008/113978 A1 | 9/2008 |
| WO | 2010/017503 A1 | 2/2010 |
| WO | 2012/008551 A1 | 1/2012 |
| WO | 2016/044104 A1 | 3/2016 |
| WO | 2016/086204 A1 | 6/2016 |
| WO | 2019/108945 A1 | 6/2019 |
| WO | 2019/113106 A1 | 6/2019 |
| WO | 2019/203926 A1 | 10/2019 |
| WO | 2020/146029 A2 | 7/2020 |
| WO | 2021/076154 A1 | 4/2021 |
| WO | 2024/019876 A1 | 1/2024 |

OTHER PUBLICATIONS

Milione et al, Orbital-Angular-Momentum Mode (De)Multiplexer, Mar. 2014, Optical Fiber Communication Conference, All Document. (Year: 2014).*

Allen, L. et al. "Orbital angular momentum of light and the transformation of Laguerre-Gaussian laser modes." Physical Review A, vol. 45, No. 11, 8185, Jun. 1992.

Bozinovic, N. et al. "Terabit-scale orbital angular momentum mode division multiplexing in fibers." Science, Jun. 28, 2013, vol. 340, No. 6140, pp. 1545-1548. 4 pages.

Ren, H., Li, X. et al. (2016). "On-chip noninterference angular momentum multiplexing of broadband light." Science, vol. 352, No. 6287, May 13, 2016, pp. 805-809. 6 pages.

Roberts, G. et al. "3D-patterned inverse-designed mid-infrared metaoptics." Nature Communications, vol. 14, No. 2768, 2023, 12 pages.

Wang, J. et al. "Terabit free-space data transmission employing orbital angular momentum multiplexing". Nature photonics, vol. 6, No. 7, Jul. 2012, pp. 488-496. 9 pages.

Willner, A. E. et al. "Orbital angular momentum of light for communications." Applied Physics Reviews, vol. 8, No. 041312, Oct. 27, 2021. 69 pages.

International Search Report and Written Opinion for International Application No. PCT/US2023/026804, filed on Jun. 30, 2023, on behalf of California Institute of Technology, Mailed on Oct. 18, 2023, 11 Pages.

Adelson E. H. et al., "Single Lens Stereo with a Plenoptic Camera" *IEEE Transactions on Pattern Analysis and Machine Intelligence*, vol. 14 No. 2,Feb. 1992, pp. 99-106.

Afifi S., et al., "Electromagnetic Scattering From 3D Layered Structures With Randomly Rough Interfaces: Analysis With the Small Perturbation Method and the Small Slope Approximatio,". IEEE Transactions on Antennas and Propagation [online], Jul. 2014 [Retrieved on Jul. 20, 2020]. 9 Pages. Retrieved from https://ieeexplore.ieee.org/abstract/document/6862023.

Aieta, F. et al., "Aberration-free ultrathin flat lenses and axicons attelecom wavelengths based on plasmonic metasurfaces," *Nano Lett.* 12,4932-4936. Aug. 15, 2012. 5 Pages.

Aieta, F. et al., "Multiwavelength achromatic metasurfaces by dispersivephase compensation," *Science* 347, 1342-1345. Mar. 20, 2015. 4Pages.

Allowance for Chinese Application No. 201580049474.8 filed on Mar. 14, 2017 on behalf of California Institute of Technology. Mail Date: Dec. 31, 2019. Chinese + English Trans. 3 Pages.

Andreou, A. G., et al., "Polarization Imaging: Principles and IntegratedPolarimeters," *IEEE Sensors Journal*, vol. 2, No. 6, Dec. 2002.pp. 566-576. 11 Pages.

Antipa, N., et al., "Video from Stills: Lensless Imaging with Rolling Shutter," arXiv:1905.13221v1 [eess.IV] May 30, 2019, 8 pages.

Appeal Decision of Refusal issued for JP Patent Application No. 2017-513414 filed on Sep. 11, 2015, on behalf of California Institute of Technology. Issue Date: Jul. 13, 2021. Japanese Original and ENG Transl. 42 Pages.

Arbabi, A., et al., "Conference Presentation: Increasing Efficiency of high-NA Metasurface Lenses," Proc. Of SPIE vol. 10113. Apr. 28, 2017. Abstract Only. 1 Page. Watch Online at https://www.spiedigitallibrary.org/conference-proceedings-of-spie/10113/101130K/Increasing-efficiency-of-high-NA-metasurface-lenses-Conference-Presentation/10.1117/12.2250391.short.

Arbabi, A. et al., "Controlling the phase front of optical fiber beams using high contrast Metastructures," *OSA Technical Digest*, STu3M.4 Optical Society of America, Jan. 2014. 2 Pages.

Arbabi, A., et al., "Dielectric metasurfaces for complete control of phase and polarization with subwavelength spatial resolution and high transmission," Nature Nanotechnology, published online on Aug. 31, 2015. 8 Pages.

Arbabi, A. et al., "Fundamental limits of ultrathin metasurfaces," Preprintat http://arXiv.org/abs/141 1.2537.Nov. 10, 2014. 6 Pages.

Arbabi, A. et al., "Fundamental limits of ultrathin metasurfaces" *Scientific Reports* 7, 43722 (Mar. 2017). 9 pages.

Arbabi, A., et al., "Miniature optical planar camera based on awide-angle metasurface doublet corrected for monochromatic aberrations," *NatureCommunications*, 7:13682. Published Nov. 28, 2016. 9 Pages.

Arbabi, A., et al., "Planar Metasurface Retroreflector," *NaturePhotonics*, Advance Online Publication. Published Online Jun. 19, 2017. 7 Pages.

Arbabi, A., et al., "Subwavelength-thick lenses with high numerical apertures and large efficiency based on high-contrast transmitarrays," Nature Communications. 6:7069. May 7, 2015. 9 Pages.

Arbabi, E., et al., "Controlling the sign of chromatic dispersion in diffractiveoptics with dielectric metasurfaces," *Optica*, V. 4, N. 6. Jun. 2017. 8 Pages.

Arbabi, E., et al., "Full-Stokes Imaging Polarimetry Using DielectricMetasurfaces," ACS Photonics 2018, 5, 3132-3140. Mar. 21, 2018. 9 Pages.

Arbabi, E., et al., "MEMS-tunable dielectric metasurface lens," NatureCommunications, 9:812. Feb. 23, 2018. 9 Pages.

Arbabi, E., et al., "Multiwavelength metasurfaces through spatial multiplexing," *Scientific Reports*, 6:32803. Sep. 6, 2016. 8 Pages.

Arbabi, E., et al., "Multiwavelength polarization-insensitive lenses basedon dielectric metasurfaces with meta-molecules," Optica, vol. 3, No. 6. Jun. 10, 2016. pp. 628-633. 6 Pages.

Arbabi et al., "Dielectric metasurfaces for complete control of phase and polarization with subwavelength spatial resolution and high transmission," + Supplementary Information. Nature Nanotechnology doi: 10.1038/nnano.2015.186/. Nov. 2015. 17 Pages.

Astilean, S., et al., "High-efficiency subwavelength diffractive element patterned in a high-refractive-index material for 633 nm," *Optics Letters*, vol. 23, No. 7, Apr. 1, 1998. pp. 552-554. 3 Pages.

Avayu, O., et al., "Composite functional metasurfaces for multispectral achromatic optics," *Nature Communications* 8, 14992 (Published Apr. 5, 2017). 8 Pages.

Ballew, C., et al., "Constraining Continuous Topology Optimizations to Discrete Solutions for Photonic Applications," ACS Photonics 2023, 836-844. 9 pages.

Ballew, C., et al., "Mechanically reconfigurable multi-functional meta-optics studies at microwave frequencies," Scientific Reports (2021) 11:11145. 9 pages. DOI:10.1038/s41598-021-88785-5.

Balthasar Mueller, J. P., et al., "Ultracompact metasurface inlinepolarimeter," *Optica*, vol. 3, No. 1. Jan. 2016. pp. 42-47.6 Pages.

(56)          References Cited

OTHER PUBLICATIONS

Cai, X., et al., "Dynamically controlling terahertz wavefronts with cascaded metasurfaces," Advanced Photonics, 2021, vol. 3(3). 036003. 10 pages.

Camayd-Muñoz, P., et al., "Multifunctional volumetric meta-optics for color and polarization image sensors," Optica, 7(4), pp. 280-283. Apr. 2020. 4 Pages.

Camayd-Muñoz, P., et al., Supplementary material for "Multifunctional volumetric meta-optics for color and polarization image sensors," Published in Optica, V. 7 No. 4, Mar. 31, 2020. 5 Pages.

Charanya, T., et al., "Trimodal color-fluorescence-polarization endoscopy aided by a tumor selective molecular probe accurately detects flat lesions in colitis-associated cancer," J. Biomed. Opt. 19(12) 126002, Dec. 2014, 15 pages.

Chen, H. T.; Taylor, A. J.; Yu, N. "A review of metasurfaces: Physics and applications." Reports on Progress in Physics 2016, 79. (41 pages).

Chen, W. T., et al., "Integrated Plasmonic Metasurfaces for Spectropolarimetry," Nanotechnology 27, 224002. Apr. 26, 2016. 8 Pages.

Chihhui, Wu., et al., "Spectrally selective chiral silicon metasurfaces based on infrared Fano resonances", Nature Communications,vol. 5, May 27, 2014, XP055465835, DOI: 10.1038/ncomms4892. 9 Pages.

Coffeen, D.L., et al., "Polarization and scattering characteristics in the atmospheres of Earth, Venus, and Jupiter," J. Opt. Soc. Am., vol. 69, No. 8, Aug. 1979. pp. 1051-1064. 14 Pages.

Communication under Rule 71(3) issued for EPPatent application 15842895.3 filed on Mar. 8, 2017, on behalf of California Institute of Technology. Mail Date: May 25, 2021. 5 Pages.

Corrected Notice of Allowance for U.S. Appl. No. 16/657,640, filed Oct. 18, 2019, on behalf of California Institute of Technology. Mail Date: Dec. 9, 2021. 11 Pages.

Decision of Refusal for JP Patent Application No. 2017-513414 filed on Sep. 11, 2015, on behalf of California Institute of Technology. Dispatch Date: May 12, 2020. Japanese + English Trans. 19 Pages.

Decision to Grant for EP Patent application 15842895.3 filed on Mar. 8, 2017, on behalf of California Institute of Technology. Mail Date: Oct. 7, 2021. 1 Page.

Decker, M., et al., "High-efficiency dielectric Huygens' surfaces," Adv. Opt. Mater. 3, 813-820. Feb. 1, 2015. 8 Pages.

Deguzman, P. C., et al., "Stacked subwavelength gratings as circular polarization filters," Applied Optics, vol. 40, No. 31. Nov. 1, 2001. pp. 5731-5737. 7 Pages.

Ding, F., et al. "Beam-Size-Invariant Spectropolarimeters UsingGap-Plasmon Metasurfaces," ACS Photonics, 943-49. Published Feb. 28, 2017. 7 pages.

Dorrah, A. H., et al., "Tunable structured light with flat optics," Science 379, eabi6860 (2022). 12 pages.

Dottermusch, S., et al., "Exposure-dependent refractive index of Nanoscribe IP-Dip photoresist layers," Optics letters, 44, V. 1, Jan. 1, 2019. pp. 29-32. 4 Pages.

Egan, W. G., "Terrestrial polarization imagery obtained from the SpaceShuttle: characterization and interpretation," Applied Optics, vol. 30,No. 4. Feb. 1, 1991. pp. 435-441. 8 pages.

Ellenbogen, T., et al., "Chromatic Plasmonic Polarizers for Active VisibleColor Filtering and Polarimetry," ACS Publications, Nano Lett. 2012, 12. Jan. 9, 2012, 1026-1031. 6 Pages.

European Examination Report for EuropeanApplication No. 19909195.0 filed on May 20, 2021 on behalf of California Institute of Technology. Mail Date: Jun. 5, 2023. 4 Pages.

Evlyukhin, A. B., et al., "Multipole light scattering by nonsphericalnanoparticles in the discrete dipole approximation," Phys. Rev. B 84,235429. Dec. 20, 2011. 8 pages.

Extended European Search Report issued for EP Application No. 19909195.0 filed on May 20, 2021, on behalf of California Institute of Technology. Mail Date: May 30, 2022. 10 Pages.

Fatemi, R., et al., "Subtractive photonics," Optics Express vol. 29, No. 2, 877-893, Jan. 2021. 17 pages.

Fattal, D., et al., "Flat dielectric grating reflectors with focusing-abilities," Nature Phonics, vol. 4. Jul. 2010. pp. 466-470. 5Pages.

Final Office Action for U.S. Appl. No. 16/656,156, filed Oct. 17, 2019, on behalf of California Institute of Technology. Mail Date: Dec. 1, 2021. 20 Pages.

Final Office Action issued for U.S. Appl. No. 16/777,491, filed Jan. 30, 2022, on behalf of California Institute of Technology. Mail date: Aug. 17, 2022. 18 Pages.

Final Office Action issued for U.S. Appl. No. 17/853,540, filed Jun. 29, 2022 on behalf of California Institute of Technology. Mail Date: Mar. 21, 2024. 16 pages.

First Chinese Office Action for Chinese Application No. 201580049474.8 filed on Mar. 14, 2017 on behalf of California Institute of Technology. Mail Date: Dec. 19, 2018. 16 Pages. English + Chinese.

First Office Action + Search Report issued for Chinese Application No. 201980067786.X filed on Apr. 14, 2021, on behalf of California Institute of Technology. Issue Date: Aug. 3, 2022. Chinese Original + English Translation. 22 Pages.

First Office Action issued for Chinese Patent Application No. 201980101356.5 filed on Oct. 18, 2019 on behalf of California Institute of Technology. Issue Date: Aug. 22, 2023. 10 pages. (English translation only).

Flanders, D.C., "Submicrometer periodicity gratings as artificial anisotropic dielectrics," Applied Physics Letters, 42: p. 492-4. Mar. 15, 1983. 4 Pages.

García-Etxarri, A. et al., "Strong magnetic response of submicronsilicon particles in the Infrared," Opt. Express 19, 4815-4826. Feb. 28, 2011. 12 Pages.

Garcia, M., et al., "Bio-inspired color-polarization imager forreal-time in situ imaging," Optica, vol. 4, No. 10. Oct. 2017.pp. 1263-1271. 9 Pages.

Garcia, N. M., "Surface Normal reconstruction using circularly polarized light," Optics Express, vol. 23, No. 11. Jun. 1, 2015. pp. 14391-14406. 16 Pages.

Gissibl, T., et al., "Refractive index measurements of photo-resists for three-dimensional direct laser writing," Optical Materials Express, 7(7), 2293-2298. Jul. 1, 2017. 6 Pages.

Groever, B., et al., "Meta-lens doublet in the visible region," NanoLett. 17, 4902-4907, Jun. 29, 2017. 6 Pages.

Gruev, V., et al., "CCD polarization imaging sensor with aluminum nanowire optical filters," Optics Express, vol. 18, No. 18. Aug. 2010. pp. 19087-19094. 8 Pages.

Gruev, V., et al., "Fabrication of a dual-tier thin film micropolarizationarray," Optics Express, vol. 15, No. 8. Apr. 16, 2007. pp. 4994-5007. 14 Pages.

Gruev, V., et al., "Image Sensor With Focal Plane Extraction of Polarimetric Information" IEEE, ISCAS. Jan. 2006. pp. 213-216. 4 Pages.

Guo, J., et al., "Fabrication of thin-film micropolarizer arrays for visibleimaging polarimetry," Applied Optics, vol. 39, No. 10. Apr. 1, 2000.pp. 1486-1492. 7 Pages.

Hong, J., et al., "Absorptive metasurface color filters based on hyperbolic metamaterials for a CMOS image censor," Optics Express vol. 29, No. 3. 3643-3658, Feb. 2021. 16 pages.

Hong, L., et al., "Integrated Angle-Insensitive Nanoplasmonic Filters for Ultraminiaturized Fluorescence Microarray in a 65 nm Digital CMOS Process," ACS Photonics, 5, Sep. 12, 2018. pp. 4312-4322. 11 Pages.

Hsiao, H-H., et al., "Fundamentals and Applications of Metasurfaces," Small Methods, Mar. 24, 2017. 20 Pages.

Huang, Y-W, et al., "Versatile total angular momentum generation using cascaded J-plates," Optics Express 7649, vol. 27, No. 5, Mar. 2018. 16 pages.

International Search Report and Written Opinion for International Application No. PCT/US2019/057026 filed on Oct. 18, 2019 on behalf of California Institute of Technology Mail Date: Aug. 10, 2020 12 pages.

International Search Report and Written Opinion for PCT App. No. PCT/US2019/056809 filed on Oct. 17, 2019 on behalf of California Institute of Technology. Mail Date: Jul. 31, 2020. 13 Pages.

(56) References Cited

OTHER PUBLICATIONS

International Search Report and Written Opinion for PCT/US2015/049837filed Sep. 11, 2015 on behalf of California Institute of Technology. Mail Date: Jan. 11, 2016. 13 pages.

Jensen J. S. et al., "Topology optimization for nano-photonics" *Laster & Photonics Reviews*, rev. 5 No. 2,2011, pp. 308-321.

Jensen J. S. et al., "Systematic design of photonic crystal structures using topology optimization: Low-loss waveguide bends" *Applied Physics Letters*,Mar. 22, 2004, vol. 84 No. 12, pp. 2022-2024.

Kamali et al., "A review of dielectric optical metasurfaces for wavefront control" Nanophotonics 2018; 7(6): 1041-1068. 28 pages.

Khorasaninejad, M., et al., "Efficient Polarization Beam Splitter PixelsBased on A Dielectric Metasurface," *Optica*, vol. 2, No. 4. Apr. 15, 2015. 7 Pages.

Khorasaninejad, M., et al., "Metalenses at visible wavelengths: Diffraction-limited focusing and subwavelength resolution imaging," Science, vol. 352 Issue 6290, Jun. 3, 2016. pp. 1190-1194. 6 Pages.

Kikuta, H. et al., "Achromatic quarter-wave plates using the dispersion of form Birefringence," Appl. Opt. 36, 1566-1572. Mar. 1, 1997. 7 Pages.

Kildishev, A. V. et al., "Planar photonics with metasurfaces," *Science*339, 1232009, Mar. 15, 2015. 8 Pages.

Klemm, A. B. et al., "Experimental high numerical aperture focusing withhigh contrast gratings," *Opt. Lett.* 38, 3410-3413. Aug. 28, 2013.4 Pages.

Komar, A., et al., "Electrically tunable all-dielectric opticalmetasurfaces based on liquid crystals," Appl. Phys. Lett. 110, 071109;doi: 10.1063/1.4976504. Feb. 15, 2017. 5 Pages.

Kozawa, Y. et al., "Generation of a radially polarized laser beam by useof a conical Brewster prism," *Opt. Lett.* 30, 3063. Nov. 15, 2005.3 Pages.

Kuznetsov, A. I., et al., "Optically resonant dielectric nanostructures," Science, V. 354 Issue 6314. Nov. 18, 2016. 10 Pages.

Lalanne, P., "Blazed binary subwavelength gratings with efficiencies larger than those of conventional échelette gratings," *Optics Letters*, vol. 23, No. 14. Jul. 15, 1998. 1081-1083. 3 Pages.

Lalanne, P. et al., "Design and fabrication of blazed binary diffractive elements with 20 sampling periods smaller than the structural cutoff," *J. Opt. Soc. Am.* A 16, 1143-1156. May 1999. 14 Pages.

Lalau-Keraly, C M., et al., "Adjoint shape optimization applied to electromagnetic design," Optics Express 21693, vol. 21, No. 18, Sep. 2013. 9 pages. DOI:10.134/EO.21.021693.

Lebbe N. et al., "Robust shape and topology optimization of nanophotonic devices using the level set method" *Journal of Computational Physics*, vol. 395, Jun. 27, 2019, pp. 710-746.

Levoy M. et al., "Light Field Microscopy" *Association for Computing Machinery*,2006, pp. 924-934.

Li, Y., et al., "UV to NIR optical properties of IP-Dip, IP-L, and IP-S after two-photon polymerization determined by spectroscopic ellipsometry," Optical Materials Express, vol. 9, No. 11, Nov. 1, 2019. pp. 4318-4328 (11 pages).

Lightman S. "Exploring for New Insights in the Performance of a 3D Orbital Angular Momentum Mode-Sorter" *Frontiers in Physics*, vol. 10, Mar. 2022, pp. 1-7.

Lin, D., et al., "Dielectric gradient metasurface optical elements," Science, U.S.A., vo. 345, p. 298-302. Jul. 18, 2014. 6 Pages.

Lin, D., et al., "Photonic Multitasking Interleaved Si NanoantennaPhased Array," *Nano Lett.*, 16. Nov. 18, 2016. pp. 7671-7676. 6Pages.

Lin, J. et al., "Nanostructured holograms for broadband manipulation ofvector beams," *Nano Lett.* 13, 4269-4274. Aug. 5, 2013. 6 Pages.

Lin, Z., et al., "End-to-end nanophotonic inverse design for imaging and polarimetry," Nanophotonics 2021; 10(3): 1177-1187. 11 pages.

Liu, V., et al., "S4: a free electromagnetic solver for layered periodic structures," Comput. Phys. Commun. 183, 2233-2244. Available online May 19, 2012. 12 Pages.

Liu, Y., et al., "Complementary fluorescence-polarization microscopy using division-of-focal-plane polarization imaging sensor," Journal of Biomedical Optics, 17 (11). Nov. 2012. 116001-1--116001-4. 5Pages.

Lu, F., et al., "Planar high-numerical-aperture low-loss focusingreflectors and lenses using subwavelength high contrast gratings," OpticsExpress, vol. 18, No. 12. Jun. 7, 2010. pp. 12606-12614. 9 Pages.

Mait J. N. et al., "Computation imaging" *Advanced in Optics and Photonics*, vol. 10 No. 2,Jun. 2018, pp. 409-483.

Mansouree, M., et al., "Multifunctional 2.5D metastructures enabled by adjoint optimization," Optica, Jan. 2020, vol. 7, No. 1. 77-84, 8 pages.

Milione G. et al., "Orbital-Angular-Momentum Mode (De)Multiplexer: A Single Optical Element for MIMO-based and non-MIMO-based Multimode Fiber Systems" *Optical Fiber Communication Conference*, Mar. 2014, 3 pages.

Miller D.A.B., "Fundamental limit for optical components," J. Opt Soc. Am. V, vol. 24, No. 10, Oct. 2007, A1-A18. 18 pages.

Miller, D.A.B., "Why optics needs thickness," Science 379, 41-45 (2023). 5 pages.

Monticone, F., et al., "Full control of nanoscale optical transmissionwith a composite Metascreen," *Phys. Rev. Lett.* 110, 203903. May 17, 2013.5 Pages.

Mutlu, M., et al., "Experimental realization of a high-contrast gratingbased broadband quarter-wave plate," *Optics express*, 20: p. 27966-73. Nov. 30, 2012. 8 Pages.

Nersisyan, S. R. "Characterization of optically imprinted polarization gratings," *Appl. Opt.* 48, 4062-4067 (2009).

Nishiwaki, S., et al., "Efficient colour splitters for high-pixel-density image sensors", *Nature Photonics*, vol. 7, No. 3, Feb. 3, 2013. pp. 248-254. 7 Pages. XP055358688, London ISSN: 1749-4885, DOI: 10.1038/nphoton.2012.345.

Non-Final Office Action for U.S. Appl. No. 14/852,450, filed Sep. 11, 2015 on behalf of California Institute of Technology. Mail Date: Dec. 12, 2016. 11 Pages.

Non-Final Office Action for U.S. Appl. No. 16/656,156, filed Oct. 17, 2019, on behalf of California Institute of Technology. Mail Date: Jul. 27, 2021. 13 pages.

Non-Final Office Action for U.S. Appl. No. 18/346,061, filed Jun. 30, 2023 on behalf of California Institute of Technology Mail Date: Jan. 22, 2026 15 pages.

Non-Final Office Action for U.S. Appl. No. 18/799,930, filed Aug. 9, 2024 on behalf of California Institute of Technology Mail Date: Jan. 23, 2026 34 pages.

Non-Final Office Action issued for U.S. Appl. No. 17/475,167, filed Sep. 14, 2021 on behalf of California Institute of Technology. Mail Date: Sep. 26, 2024. 43 pages.

Non-Final Office Action issued for U.S. Appl. No. 17/853,540, filed Jun. 29, 2022 on behalf of California Institute of Technology. Mail Date: Nov. 16, 2023. 30 pages.

Nordin, G. P., et al., "Diffractive Optical Elements for Strokes VectorMeasurement with a Focal Plane Array," *Proceedings of SPIE*, vol. 3754.Part of the Conference on Polarization. Jul. 1999. 10 Pages.

Nordin, G. P., et al., "Micropolarizer array for infrared imaging polarimetry," *J. Opt. Soc. Am. A.*, vol. 16, No. 5. May 1999. pp. 1168-1174. 7 Pages.

Notice of Allowability for U.S. Appl. No. 16/656,156, filed Oct. 17, 2019, on behalf of California Institute of Technology. Mail Date: Jun. 8, 2022. 3 Pages.

Notice of Allowance for U.S. Appl. No. 16/656,156, filed Oct. 17, 2019, on behalf of California Institute of Technology. Mail Date: Apr. 7, 2022. 11 Pages.

Notice of Allowance for U.S. Appl. No. 16/657,640, filed Oct. 18, 2019, on behalf of California Institute of Technology. Mail Date: Sep. 29, 2021. 9 Pages.

Notice of Allowance for U.S. Appl. No. 14/852,450, filed Sep. 11, 2015 on behalf of California Institute of Technology. Mail Date: Apr. 25, 2017. 11 Pages.

Notice of Reasons for Refusal issued for Japanese Patent Application No. 2022-515969 filed on Oct. 18, 2019 on behalf of California Institute of Technology. Dispatch Date: Aug. 8, 2023. 15 pages.

(56) References Cited

OTHER PUBLICATIONS

Notice of Reasons for Refusal issued for Japanese Patent Application No. 2021-512844 filed on Mar. 8, 2021 on behalf of California Institute of Technology. Dispatch Date: Sep. 5, 2023. 13 pages. (English translation only).

Notice To File A Response issued for KR Application No. 10-2021-7009690 filed on Apr. 1, 2021, on behalf of California Institute of Technology. Dispatch Date: Jul. 26, 2023. 5 Pages.

Notification for Reason of Refusal for JP Patent application JP 2017-513414 filed on Sep. 11, 2015 on behalf of California Institute of Technology. Drafting Date: Aug. 15, 2019. Japanese + English Trans. 17 Pages.

Notification of Reasons for Refusal issued for Japanese Patent Application No. 022-076165 filed on May 30, 2022, on behalf of California Institute of Technology. Dispatch Date: Jul. 5, 2022. JP Original and English Translation. 7 Pages.

Notification of Reasons for Refusal Issued for Japanese Patent Application No. 2020-153339 filed on Sep. 11, 2020, on behalf of California Institute of Technology. Mail Date: Nov. 30, 2021. Japanese Original + English Translation. 5 Pages.

Notification of Reasons for Refusal issued for JP Application No. 2022-076165 filed on May 30, 2022, on behalf of California Institute of Technology. Dispatched on Feb. 21, 2023. JP Original and English Translation. 7 Pages.

Paniagua-Dominguez, R., et al., "A Metalens With Near-Unity Numerical Aperture," Nano Letters, Published online on Feb. 27, 2018. 32 Pages.

Pegard, N.C., et al., "Compressive light-field microscopy for 3D neural activity recording," Optica, vol. 3, No. 5, May 2016. 517-524. 8 pages.

Pezzaniti, J. L., et al., "Mueller matrix imaging polarimetry," OpticalEngineering, vol. 34 No. 6. Jun. 1995. pp. 1558-1568. 11 Pages.

Pfeiffer, C et al., "Cascaded metasurfaces for complete phase andpolarization control," Appl. Phys. Lett. 102, 231116. Published online Jun. 11, 2013. 5 pages.

Phelan, C. F. et al., "Generation of a radially polarized light beamusing internal conical diffraction," Opt. Express 19, 21793-21802, Oct. 20, 2011. 10 Pages.

Piggot, A. Y., et al., "Inverse design and demonstration of a compact and broadband on-chip wavelength demimultiplexer" Nat. Photonics 9, Jun. 2015. pp. 374-377. 5 Pages.

Q. Chen et al., "Nanophotonic Image Sensors" Small 12, 4922-4935 (2016). 14 pages.

Rejection Decision issued for CN Application No. 201980067786.X filed on Apr. 14, 2021 on behalf of California Institute of Technology. Mail Date: Jan. 2, 2024. Chinese + English translation. 9 pages.

Restriction Requirement for U.S. Appl. No. 16/656,156, filed Oct. 17, 2019 on behalf of California Institute of Technology Mail Date: Mar. 2, 2021 6 pages.

Restriction Requirement issued for U.S. Appl. No. 17/853,540, filed Jun. 29, 2022 on behalf of California Institute of Technology. Mail Date: Sep. 22, 2023. 6 Pages.

Roberts, N. W., et al., "Animal Polarization Imaging and Implications for optical Processing," Proceedings of the IEEE, vol. 102 No. 10. Oct. 2014. pp. 1427-1434. 8 Pages.

Roques-Carmes C. et al., "Toward 3D-Printed Inverse-Designed Metaoptics" ACS Photonics, vol. 9, Jan. 7, 2022, pp. 43-51.

Rubin, N A., et al., "Imaging Polarimetry through metasurface polarization gratings," Optics Express vol. 30, No. 6, Mar. 2022, 9389-9412. 24 pages.

Rubin, N. A., et al., "Matrix Fourier optics enables a compact full-Stokes polarization camera," Science, 365(6448), eaax1839. Jul. 5, 2019. 10 Pages.

Schonbrun, E. et al., "Reconfigurable imaging systems using elliptical nanowires," Nano Lett. 11, 4299-4303. Sep. 16, 2011. 5 Pages.

Search Report issued for Japanese Patent Application No. 2020-153339 filed on Sep. 11, 2020, on behalf of California Institute of Technology. Date Available: Oct. 27, 2021. Japanese Original + English Translation. 24 Pages.

Second Chinese Office Action for Chinese Application No. 201580049474.8 filedon Mar. 14, 2017 on behalf of California Institute of Technology. MailDate: Aug. 2, 2019. Chinese + English Trans. 11 Pages.

Second Chinese Office Action for Chinese Application No. 201980067786.X filed on Apr. 14, 2021 on behalf of California Institute of Technology. Mail Date: Feb. 27, 2023. 8 Pages. English + Chinese.

Second Notice of Reasons for Refusal issued for Japanese Patent Applicaiton No. 2022-515969 filed on Oct. 18, 2019 on behalf of California Institute of Technology. Dispatch Date: Jan. 9, 2024. 6 pages. (English translation + Japanese Original).

Second Notice of Reasons for Refusal issued for Japanese Patent Application No. 2021-512844 filed on Mar. 8, 2021 on behalf of California Institute of Technology. Dispatch Date: Jan. 30, 2024. 14 pages. (English translation + Japanese Original).

Second Notification of Reasons for Refusal issued for JP Application No. 2022-076165 filed on May 30, 2022, on behalf of California Institute of Technology. Dispatched on Oct. 18, 2022. JP Original and English Translation.

Sell, D., et al., "Large-Angle, Multifunctional Metagratings Based on Freeform Multimode Geometries," Nano Letters. 17, 3752-3757. May 1, 2017. 6 Pages.

Shastri K. et al., "Nonlocal flat optics" Nature Photonics, vol. 17,Jan. 2023, pp. 36-47.

Solomon, J. E., et al., "Polarization imaging," Applied Optics, vol. 20, No. 9. May 1, 1981. pp. 1537-1544. 8 Pages.

Spinelli, P., et al., "Broadband omnidirectional antireflection coating based on subwavelength surface Mie resonators," Nature Commun. 3,692. Feb. 21, 2012. 5 Pages.

Staude, I., et al., "Metamaterial-inspired silicon nanophotonics," NaturePhotonics, vol. 11. May 2017. pp. 274-284. pp. 11 Pages.

Supplementary Search Report and Opinion for EPPatent application 15842895.3 filed on Mar. 8, 2017, on behalf of California Institute of Technology. Mail Date: May 15, 2018. 6 pages.

Suzen, M., et al., "Compressed sensing in diffuse optical tomography," Optics Express 23676-23690, Nov. 8, 2010, vol. 18, No. 23. 15 pages.

Swanson, G. J., "Binary optics technology: the theory and design ofmulti-level diffractive optical elements," Technical Report 845. MassachusettsInstitute of Technology, DTIC, Aug. 14, 1989. 53 Pages.

Third Chinese Office Action issued for CN application No. 201980067786.X filed on Apr. 14, 2021 on behalf of California Institute of Technology. Issue Date: Sep. 14, 2023. 5 pages. English translation only.

Tyo, J.S., et al., "Review of passive imaging polarimetry for remote sensing applications," Applied Optics, vol. 45, No. 22. Aug. 1, 2006.pp. 5453-5469. 17 Pages.

Vercruysee, D., et al., "Analytical level set fabrication constraints for inverse design," Scientific Reports (2019) 9:98999. 7 pages. DOI:10.1038/s41598-019-45026-0.

Vo, S., et al., "Sub-Wavelength Grating Lenses with a Twist," IEEE Photonics Technology Letters, vol. 26, No. 13. Jul. 1, 2014. 4 Pages.

Walraven, R., "Polarization imagery," Optical Engineering, vol. 20 No. 1. Jan.-Feb. 1981. 5 Pages.

Wang A. et al., "Light field image sensors based on the Talbot effect" Applied Optics, vol. 48 No. 31,Nov. 2009, pp. 5897-5905.

Warren, M.E., et al., "High-efficiency subwavelength diffractive opticalelement in GaAsfor 975 nm," Optics Letters, Jun. 15, 1995. 20: p. 1441-3. 3 Pages.

Wen, D., et al., "Metasurface for characterization of the polarization state of light," Optics Express, vol. 23, No. 8., pp. 10273-10281. Apr. 13, 2015. 10 Pages.

West, P.R. et al., "All-dielectric subwavelength metasurface focusinglens," Opt. Express 22, 26212. Oct. 20, 2014. 10 Pages.

Yang, Y. et al., "Dielectric meta-reflectarray for broadband linear polarization conversion and Optical vortex Generation," Nano Lett. 14, 1394-1399. Feb. 18, 2014. 6 Pages.

Yu, N., et al., "A broadband, background-free quarter-wave plate basedon plasmonic Metasurfaces," Nano letters, 12: p. 6328-33. Nov. 6, 2012,6 Pages.

(56) References Cited

OTHER PUBLICATIONS

Yu, N. et al., "Flat optics with designer metasurfaces," Nature Mater. 13, 139-150. Published online Jan. 23, 2014. 12 Pages.

Yu, N. et al., "Light propagation with phase discontinuities: generalizedlaws of reflection and refraction," *Science* 334, 333-337. Oct. 21, 2011.6 Pages.

Zhan., A., et al., "Metasurface Freeform Nanophotonics," Scientific Reports, 7:1673. Published online on May 10, 2017. 9 Pages.

Zhan, Q., "Cylindrical vector beams: from mathematical concepts toapplications," Adv. Opt. Photon. 1, 1-57. Jan. 29, 2009. 57 Pages.

Zhao, N., et al., "Perfect RGB-IR Color Routers for Sub-wavelength Size CMOS Image Sensor Pixels," Adv. Photonics Res. 2021, 2. 10 pages. DOI:10.1002/adpr.202000048.

Zhao, Y. et al., "Twisted optical metamaterials for planarized ultrathinbroadband circular polarizers," *Nature Commun.* 3, 870. May 29, 2012.7 Pages.

Zhou Y. et al., "Multilayer Noninteracting Dielectric Metasurfaces for Multiwavelength Metaoptics" *American Chemical Society*, vol. 18,Nov. 5, 2018, pp. 7529-7537.

* cited by examiner

200A

<u>200C</u>

$|S_1\rangle$

Transmission (T)

Wavelength, $\lambda$ ($\mu$m)

$T_{|S_1\rangle \rightarrow Q_0}$
$T_{|S_1\rangle \rightarrow Q_1}$
$T_{|S_1\rangle \rightarrow Q_2}$
$T_{|S_1\rangle \rightarrow Q_3}$

ORBITAL ANGULAR MOMENTUM SPLITTING WITH VOLUMETRIC META-OPTICS

CROSS REFERENCE TO RELATED APPLICATIONS

The present application claims priority to U.S. Provisional Patent Application No. 63/391,411 filed on Jul. 22, 2022, incorporated herein by reference in its entirety.

STATEMENT OF GOVERNMENT GRANT

This invention was made with government support under Grant No. HR0011-17-2-0035 awarded by DARPA. The government has certain rights in the invention.

FIELD

The presented disclosure is related to broadband optical devices functioning as orbital angular momentum splitters.

BACKGROUND

In addition to wavelength and polarization, a wavefront also has a varying spatial structure. One characteristic of this spatial structure is the amount of angular momentum carried by the light. This can come in two forms: (1) As an example, in the case of a circular polarization, the spin degree of freedom is encoded in the handedness of the polarization where left and right circular polarization carry spin values of +1 and −1, respectively and (2) the orbital angular momentum, which is a property of the amplitude and phase variations of the beam and can take on an infinite number of values.

Sensing and creation of beams with angular momentum is useful for a variety of applications. The dominant usage in research and practice to date has been in optical communications where information can be multiplexed onto the theoretically infinite set of basis states each with different orbital angular momentum. By adding spin, bandwidth can be doubled. This comes in two main forms, the first in free space where the Laguerre Gauss modes describe the shape of light with different angular momentum values [see references 1, 2, 3]. In cases where the usage of high orbital angular momentum values is problematic for sending information, communication bandwidth can be achieved through the use of spatially separated beamlets each carrying information on a few number of angular momentum degrees of freedom. These beamlets can be generated and detected in parallel by an array of devices at the pixel level [see reference 4].

The existing devices that operate based on angular momentum splitting encounter various challenges. Firstly, these devices tend to be bulky and large in comparison to the operational wavelength. Secondly, there is a difficulty in tiling the devices adjacent to one another due to pitch/device spacing issues. Additionally, these devices do not readily integrate with a standard imaging sensor, making it challenging, for example, to place them directly on top of a grid of sensor pixels. Moreover, customization of these devices to operate with different input angular momentum states and polarizations is limited. Lastly, adapting the designs of these devices to accommodate various geometries, such as fiber tips, often poses a significant challenge.

Therefore, there is a need for devices and methods to address the above-mentioned challenges and issues.

SUMMARY

The disclosed methods and devices address the problems and technical issues as described in the previous section.

The disclosed teachings are related to volumetric meta-optics where metamaterials are used to control light within a three-dimensional volume. More specifically, the described devices include complex three-dimensional (3D) structures allowing the splitting of angular momentum with higher efficiency. These structures could be implemented inside a camera or used in conjunction with a fiber communication system or could be tiled into an array for imaging or spatially resolved angular momentum detection for free space communication.

According to a first aspect of the present disclosure, an optical arrangement is provided, comprising: a focal plane; a three-dimensional (3D) angular momentum splitter configured to: split an incident electromagnetic wave along optical states, the optical states including a plurality of angular momentum states, focus the split electromagnetic wave onto target areas corresponding to the plurality of angular momentum states, the target areas being on the focal plane.

According to a second aspect of the present disclosure, a method of splitting an electromagnetic wave, into a plurality of waves with different optical states, is disclosed, the optical states including a plurality of angular momentum states, the method comprising: defining one or more figures of merit based on the plurality of angular momentum states; optimizing the one or more figures of merit, thereby calculating a set pattern; patterning a 3D volume in accordance with the set pattern; thereby forming a three-dimensional (3D) angular momentum splitter; applying the electromagnetic wave to the 3D angular momentum splitter at a first side thereof; scattering off the electromagnetic wave to generate a plurality of electromagnetic waves corresponding to plurality of angular momentum states, the plurality of electromagnetic waves exiting the 3D angular momentum splitter at a second side thereof.

Further aspects of the disclosure are provided in the description, drawings and claims of the present application.

DETAILED DESCRIPTION

Figure 1:
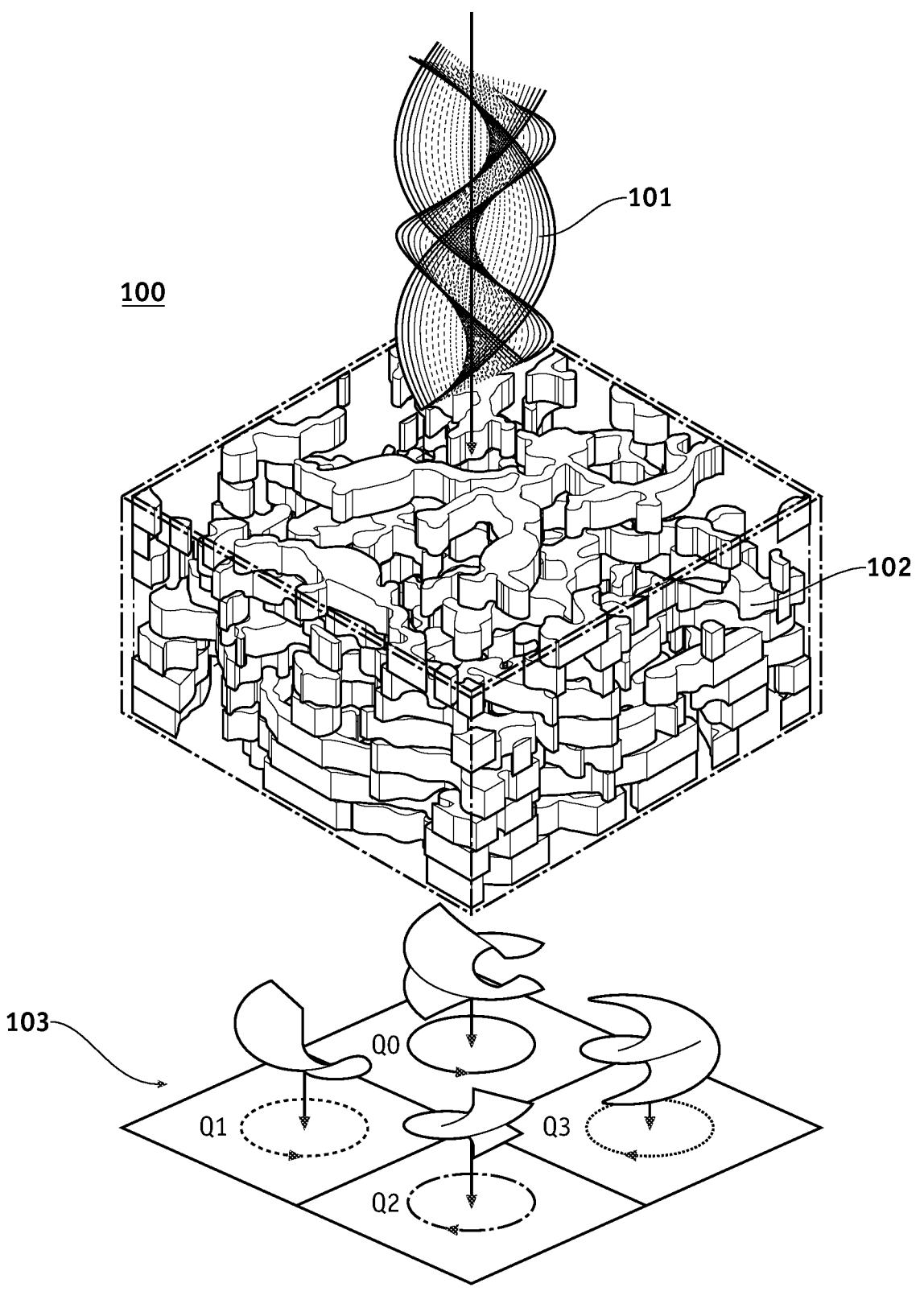
FIG. 1 shows an exemplary optical arrangement including an orbital angular momentum splitter according to an embodiment of the present disclosure.

FIG. 1 shows an optical arrangement (100) that incorporates a three-dimensional (3D) angular momentum splitter (102), in accordance with an embodiment of the present disclosure. Incident light (101) enters from above and undergoes scattering while traversing the angular momentum splitter (102). The scattered light is then sorted within a focal plane (103) into four different optical states (S0, . . . , S3).

In an embodiment, the states may be chosen to carry, for example angular momentums of (−2, −1, 1, 2) paired with spins of (1, 1, −1, −1), respectively. Stated differently, the incident light, apart from possessing distinct angular momenta, represented by (−2, −1, 1, 2), additionally encompasses two distinct circular polarization states, whereby the handedness of each state is represented by one of the spins (1, −1). Focal plane (103) comprises four targeted areas represented by quadrant (Q0, . . . , Q3) aligned with focal plane array image sensors (not shown). States (S0, . . . , S3) essentially represent distinctive portions of scattered light received by corresponding pixels aligned with quadrants (Q0, . . . , Q3) after being scattered when passing through angular momentum splitter (102). Stated differently, incident light (101), after passing through angular momentum splitter (102), is split along various optical states. The split light is then focused onto target areas on the focal plane, the target areas being represented by quadrant (Q0, . . . , Q4). Although the embodiment shown use light as input, the teachings of the present disclosure are applicable to any electromagnetic wave with an arbitrary wavelength.

The embodiment of FIG. 1 assumes polarization multiplexing on two orthogonal circular polarization states, which is referred to, throughout this document, as the spin degree of freedom. This is different than the orbital angular momentum degree of freedom which describes how the phase of the electric field varies spatially. At each point in space, the electric field is also polarized due to its nature as a vector quantity. This polarization is three-dimensional, however, for the purpose of defining the polarization state, only the axes perpendicular to the direction of propagation are taken into consideration. Such axes are denoted as $\hat{x}$, $\hat{y}$ such that a polarization $\hat{p}=a\hat{x}+b\hat{y}$ for complex values of (a, b). According to the teachings of the present disclosure, two polarization states can be independently controlled if they are orthogonal. The circular polarization states are defined by $$(a, b) = \left(\frac{1}{\sqrt{2}}, \frac{i}{\sqrt{2}}\right), \left(\frac{1}{\sqrt{2}}, \frac{-i}{\sqrt{2}}\right),$$

the first referred to as left circular polarization ($\hat{v}_l$) and the second as right circular polarization ($\hat{v}_r$). These are orthogonal states because $\hat{v}_l \cdot \overline{\hat{v}_r} = 0$, i.e.—the dot product between one vector and its complex conjugate is 0. According to further embodiments of the present disclosure, any choice of two pairs of (a, b) that is orthogonal in the same way can be used for polarization multiplexing. This includes the linear horizontal and vertical polarization pair (a, b)=(1,0), (0, 1), as well as any linear polarization combination that is orthogonal or any arbitrary elliptical polarization state pair that is orthogonal.

With continued reference to FIG. 1, According to the teachings of the present disclosure, the 3D angular momentum splitter (102) can be efficiently designed using an adjoint variable method. Such method optimizes a specified objective function which is often based on the efficient focusing of incident light into one of quadrants (Q0, . . . , Q3), depending on the input optical state. As described previously, such state which is defined based on a combination of the orbital angular momentum and polarization spin. The design process starts with an empty volume and involves iterative updates to an initial geometry to enhance performance. Full-wave finite-difference time-domain (FDTD) simulations are utilized to calculate the sensitivity of a specific figure of merit, to refractive index perturbations. As will be detailed later with regards to the embodiments of FIGS. 2A-2E, the intensity or contrast of the light received in respective quadrants are examples of the figure merit. Multiple incident angular momentum states across a desired broad bandwidth are considered to assign each state to a different pixel. In some embodiments, a gradient-descent algorithm is employed to iteratively improve and update the initial geometry.

Continuing with the embodiment of FIG. 1 and the design process as disclosed above, the 3D orbital momentum splitter (102) is made by patterning a 3D volume at subwavelength resolution in all dimensions, the patterning being performed based on one or more set objective functions/figures of merit. In other words, the 3D splitter is formed into a single block of material with interstices, by structuring, based on the set 3D pattern, a refractive index of the 3D splitter. As described more in detail later, in some embodiments, the vertical dimension may be divided into coarser layers to accommodate standard lithography fabrication processes. Each angular momentum state serves as input for forward illumination and is designed to focus on a distinct quadrant at the focal plane, aligning with a different pixel on a focal plane array sensor. The gradient required to improve the device's permittivity profile for quadrant-specific focusing is determined through the interfering fields from forward illumination and a dipole adjoint source originating from the target quadrant. A combined gradient from all angular momentum forward sources is utilized to adjust the device's permittivity in a direction that enhances overall performance. This iterative process continues until convergence is achieved. According to the teachings of the present disclosure, the angular momentum splitter may be made from a material with a refractive index of, for example n=1.5 while the interstices may be filled by air or a material with a refractive less than that of the material the splitter is made of.

FIGS. 2A-2E show exemplary graphs according to the embodiment of the present disclosure, illustrating the performance of the device where two metrics are quantified. The first is the contrast, which describes how much of each mode goes to the desired quadrant versus the other quadrants. Second, the total transmission values normalized to incident power on the top of the cube are shown for each input state. Critically, these values can approach a value of 1 and are not limited by detecting multiple states. This can be contrasted with devices that first split the beam into four beams and then filter for a given state. These existing schemes are limited to a transmission of 0.25 at best, far exceeded by the device shown.

Figure 2A:
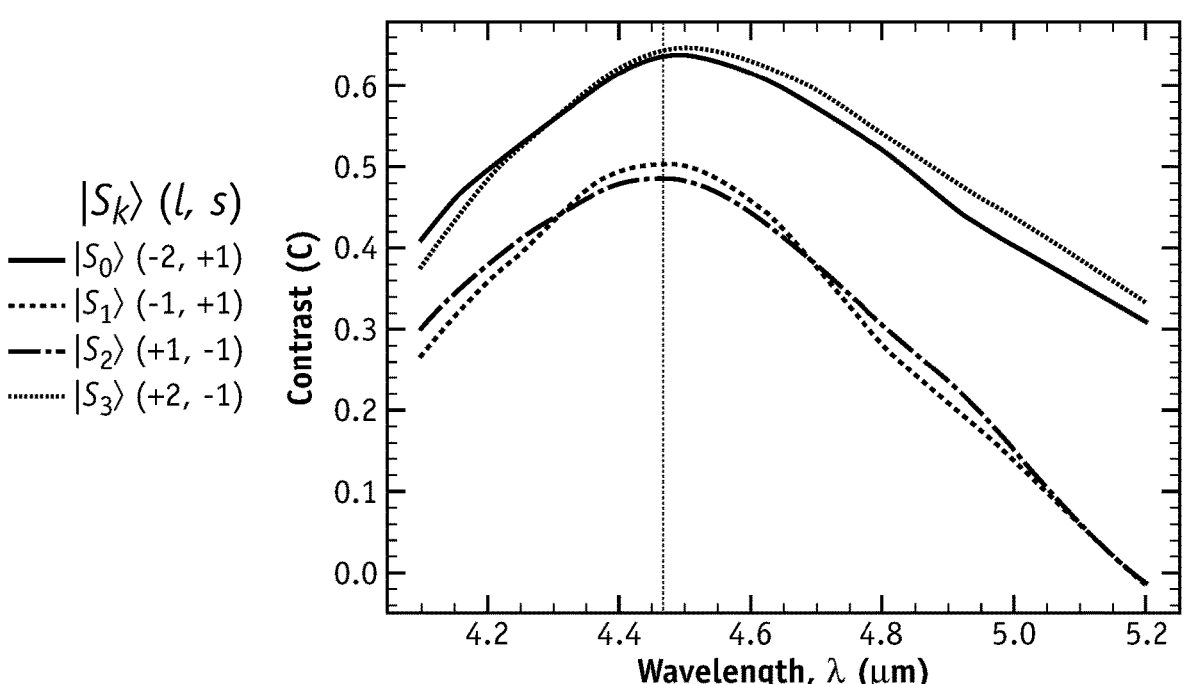
FIGS. 2A-2E show exemplary graphs illustrating the performance of the angular momentum splitters according to an embodiment of the present disclosure.
Figure 2B:
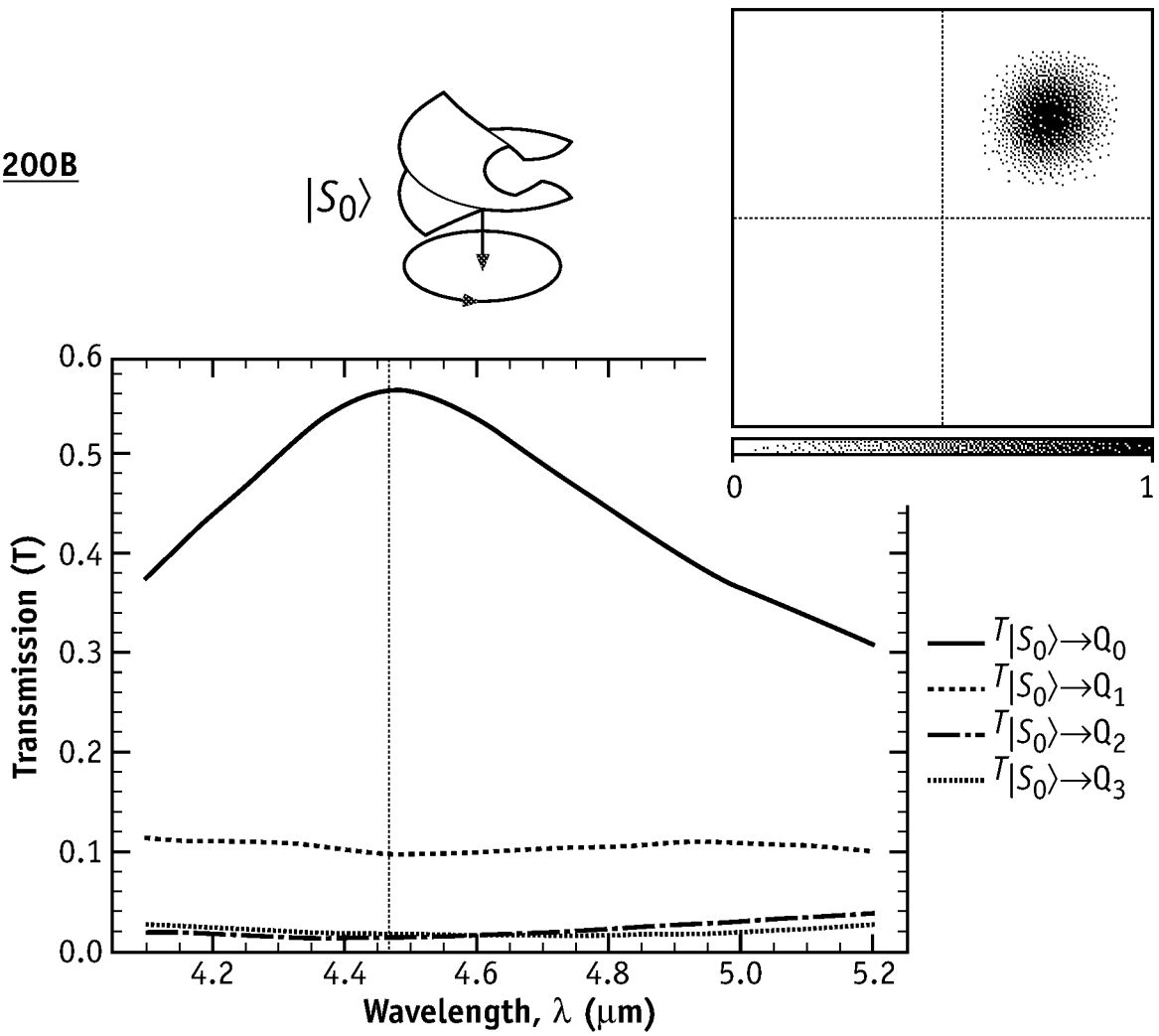
Figure 2C:
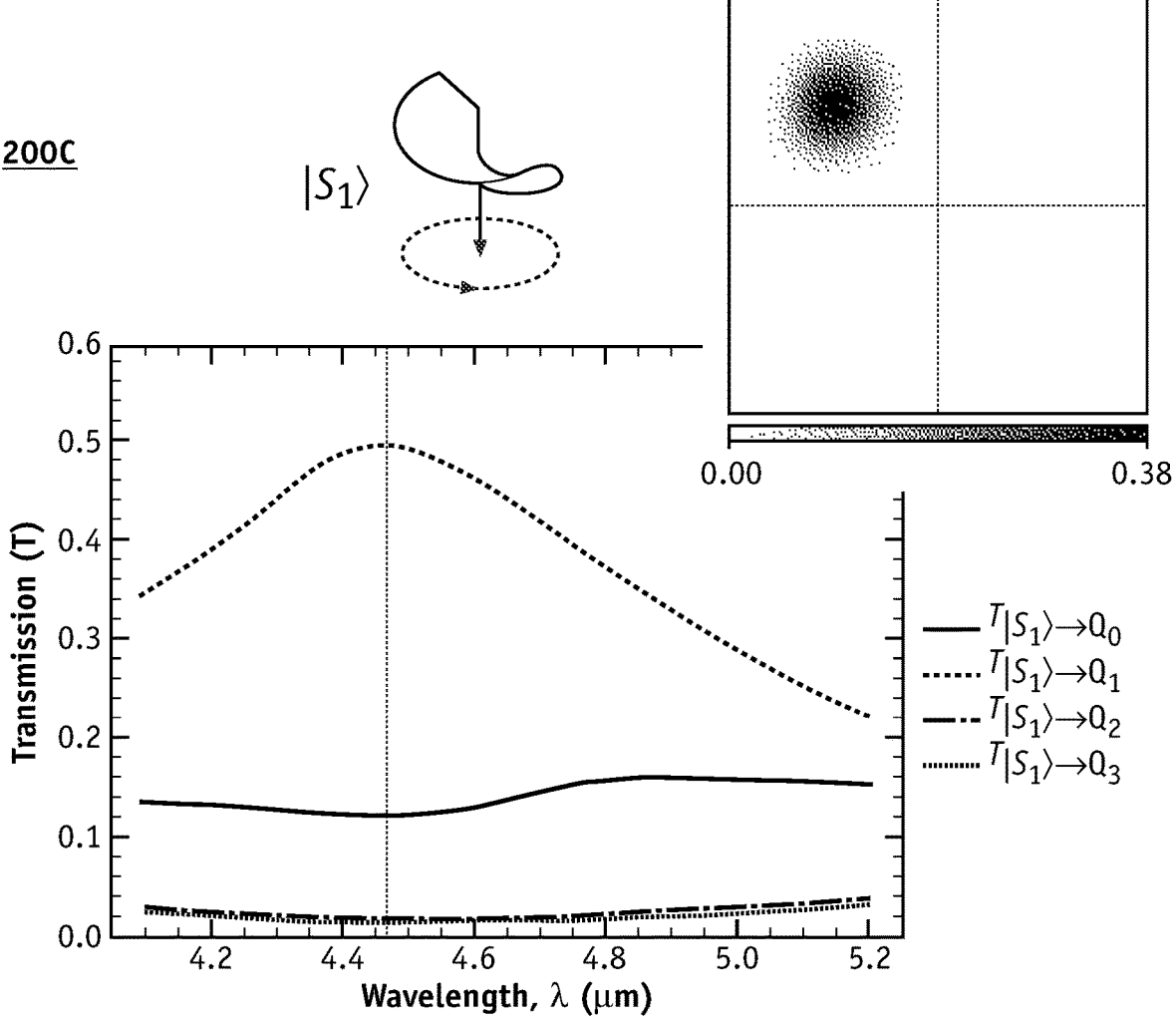
Figure 2D:
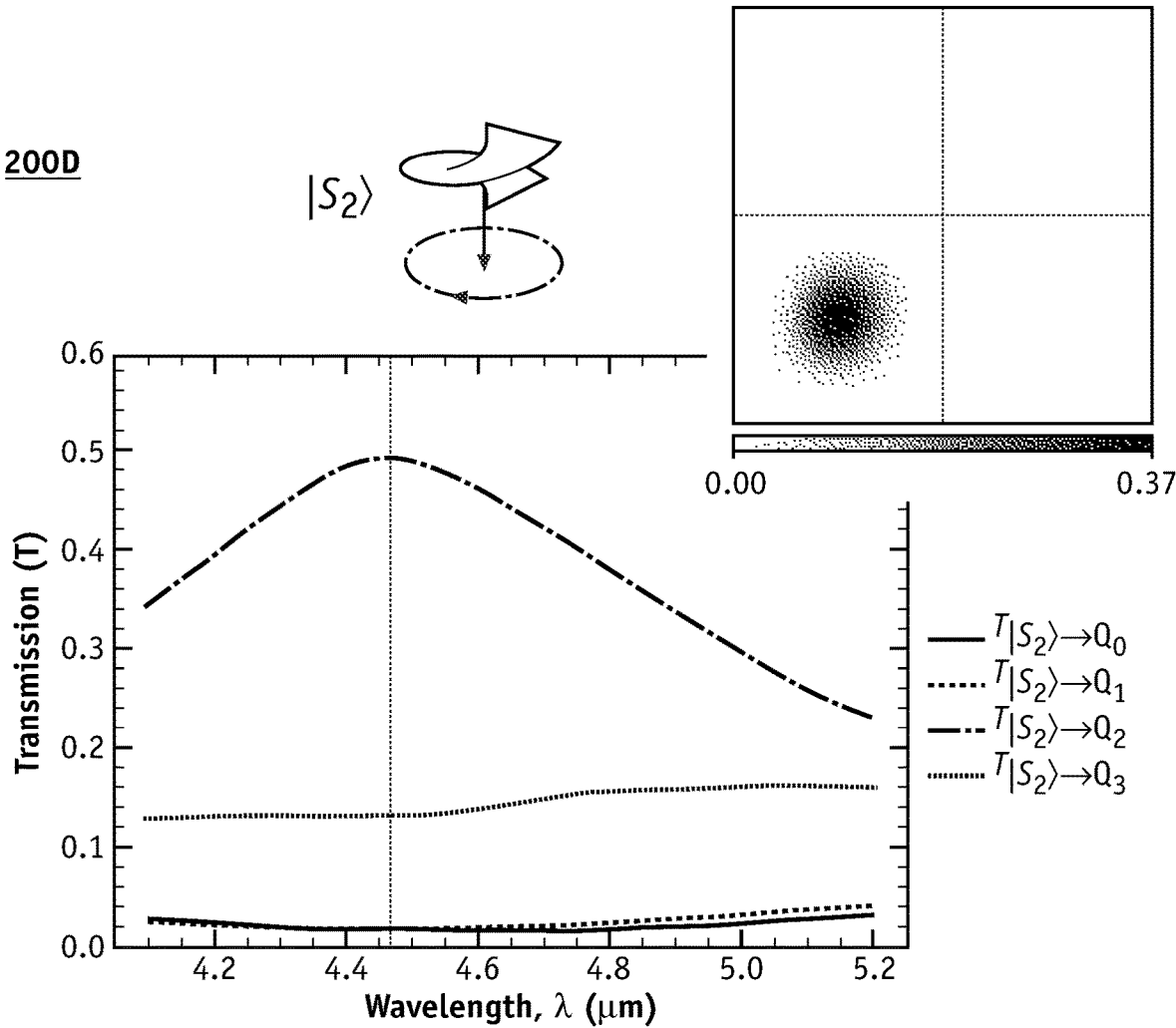
Figure 2E:
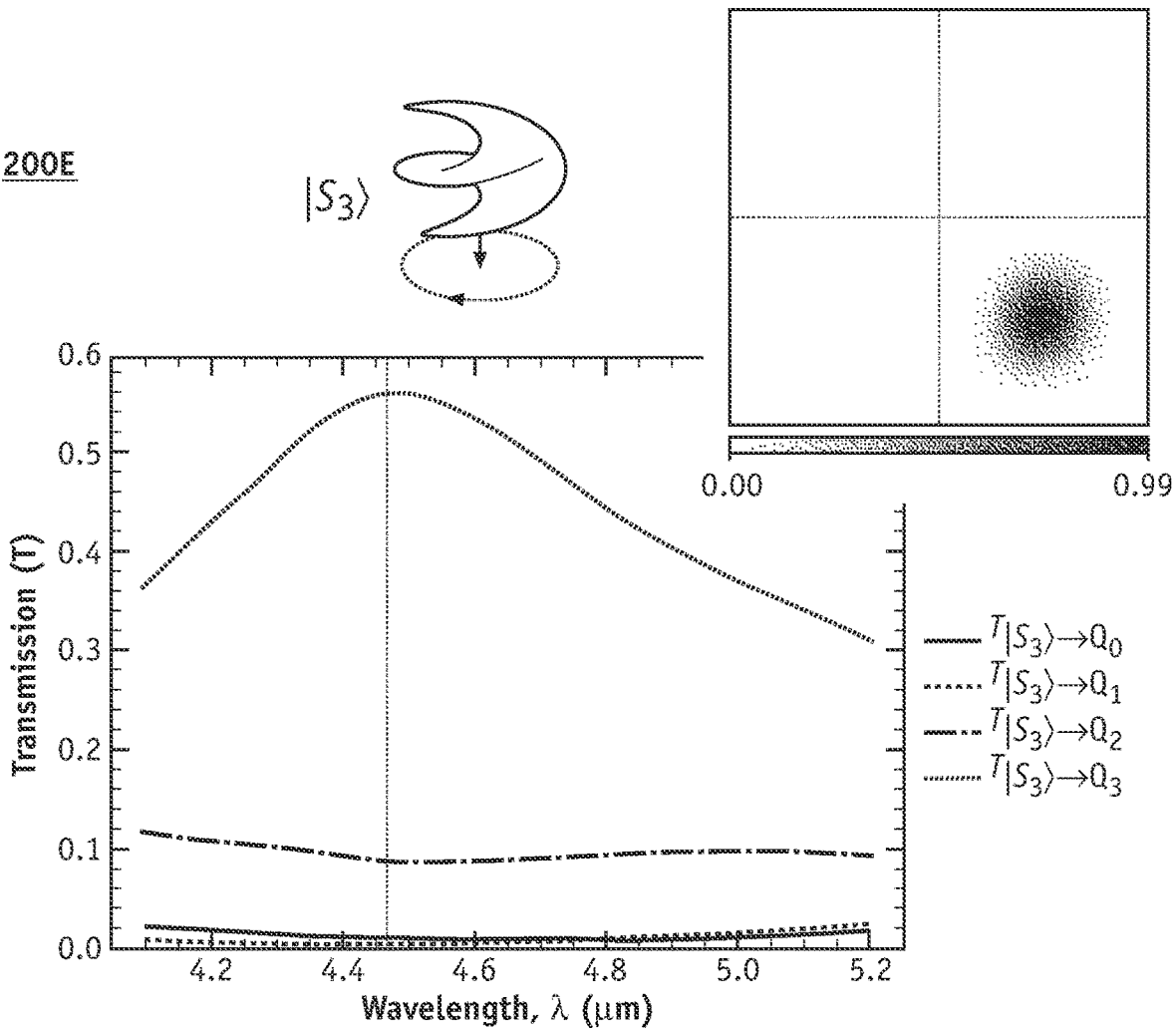

Graph (200A) of FIG. 2A show contrast of each sorting state (S0, . . . , S3) as a function of the wavelength of the input light. As shown, each state carries specific pair (l, s) corresponding, where (l, s) represents the angular momentum and spin, respectively. As an example, state (S0) corresponds to the pair (−2, +1) and as a further example state (S2) corresponds to pair (+1, −1). Contrast is defined as $$C = \frac{T_{correct} - T_{incorrect}}{T_{correct} + T_{incorrect}},$$

where $T_{correct}$ is transmission into the desired quadrant for a given input mode and $T_{incorrect}$ is transmission elsewhere in the focal plane for that same mode. The dashed line is the design wavelength and as can be noticed, the contrast of each state peaks at such design wavelength.

Exemplary graphs (200B-200E) of FIGS. 2B-2E show breakdown of transmission for each state by quadrant and intensity on the focal plane given each illumination state. For each state, the transmission is plotted over a broad band where the dashed line is the design wavelength. As can be noticed, for each state, the intensity of the received light in the quadrant corresponding to such state is substantially larger than the intensity of light received at the other quadrants Performance of the device falls off gently away from this design point but can be made to operate over a broader band by adding this requirement explicitly into the optimization process as disclosed previously. Further, larger devices disposed on top of more sensor pixels that sort on both the angular momentum and wavelength of the input can increase the bandwidth and richness of imaging. These devices can be designed with the same methods described in this disclosure. While specific angular momentum states were chosen for this device demonstration, a different device can be designed with the same technique targeted towards different angular momentum modes. This can be chosen differently for each application or even chosen to be different at each point in the array for richer imaging and communication systems.

The disclosed methods and devices offer potential advantages for various applications. Fiber communication networks can benefit from multiplexing on the angular momentum degree of freedom by using special fibers that can reliably propagate a set of angular momentum modes [5]. While these modes will not have identical shape to the free space modes shown in this disclosure, the same types of devices can be used to detect and generate these modes by modifying slightly the input illumination profile to the optimization algorithm based on the fiber mode profiles.

A core challenge in the above-mentioned fiber communication networks is the ability to both create/multiplex the desired angular momentum states on the transmitter end and demultiplex them on the receiver side. The disclosed devices can efficiently accomplish both tasks without losing efficiency through beam splitting and filtering. For instance, in a fiber communication system, these techniques can be utilized on the transmitter side to encode information based on multiple orbital angular momentum states. The transmitter generates light carrying these states and transmits them using the disclosed teachings. On the receiving end, the received light can be divided into different pixels, precisely aligned with sensors, allowing the extraction of the necessary information and subsequent processing.

Figure 3:
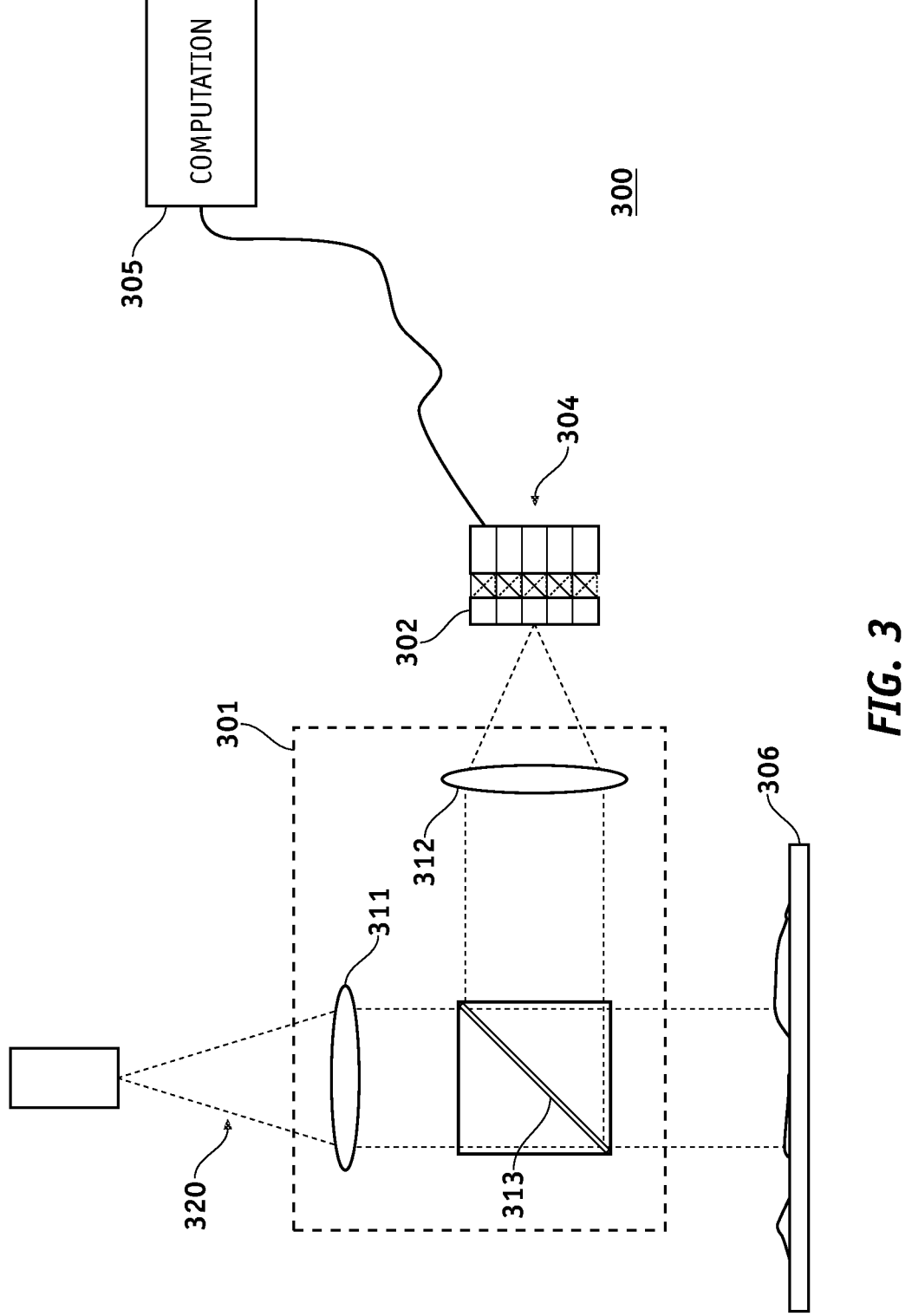
FIG. 3 shows an exemplary optical arrangement illustrating an application of the teachings of the present disclosure.

The described methods and devices can also be implemented as part of cameras or used in imaging systems. In order to further clarify this, reference is made to FIG. 3 showing an exemplary optical arrangement (300) including an optical block (301), angular momentum splitter array (302), sensor array (304) and processing unit (305). Optical block (301) comprises lenses (311, 312) and beamsplitter (313) to guide light throughout the system. The principle of operation of angular momentum splitter (302) is similar to what was described with regards to angular momentum splitter (102) of FIG. 1.

Incident light (320), after traversing optical block (301) will hit object (306), and subsequently undergo reflection. The irregularities present on the surface of the object (306) will cause the reflected light to exhibit various states of angular momentum that are specific to such irregularities. Subsequently, the reflected light will be directed, after being guided through optical block (301), towards the angular momentum splitter (302), where it will undergo spatial separation into the distinct components that have differing angular momentum states, as mentioned above. These spatially separated light components will then be collected by sensor arrays (304) and transmitted to a processing unit (305). The processing unit will then employ subsequent data analysis based on the received information to infer the properties of the object (306).

With reference to the embodiment of FIG. 3, although shown here in reflection, the same concept can be applied to image in transmission. For this approach, the beamsplitter can be removed and the lens can image light passing through the sample directly onto the array of angular momentum splitting devices that sort light onto the pixels in the focal plane array. The device shown can be used directly for the imaging application above where the scene is decomposed by its spatial overlap with local angular momentum beamlets. The person skilled in the art will understand that the embodiment of FIG. 3 serves merely as an illustrative example showcasing the potential applications of the teachings that have been disclosed. It is important to note that any configuration wherein light passes through or reflects from a sample can benefit from the aforementioned teachings, as they enable the generation of angular momentums and/or facilitate their utilization for the purposes of processing and data analysis.

The angular momentum sorting devices can also be used in reverse to generate OAM modes that can be transmitted in free space or fiber. This may be performed by illuminating points in the focal plane and using the reciprocal nature of the device. In other words, if one focal point is illuminated upon excitation of the splitter with a given angular momentum state, then if that same focal point is excited directly, the device will transform that excitation back into the same angular momentum state. For this to work in practice, adjustments to the design may be made to focus light into each quadrant with a specific, likely linear, polarization for ease of reciprocal illumination. Using a spatial light modulator and a lens, a pattern of spots can be projected with this polarization onto the focal planes of an array of devices or an array of polarized laser sources can be placed directly in the focal plane. Then, one can choose which angular momentum states to create from the devices by changing the illumination pattern from the spatial light modulator or turning on/off different laser sources.

According to the teachings of the present disclosure, individual incarnations of the described devices can be paired with single point free space systems or fiber communication systems with small adjustments to the input mode profile.

Figure 4:
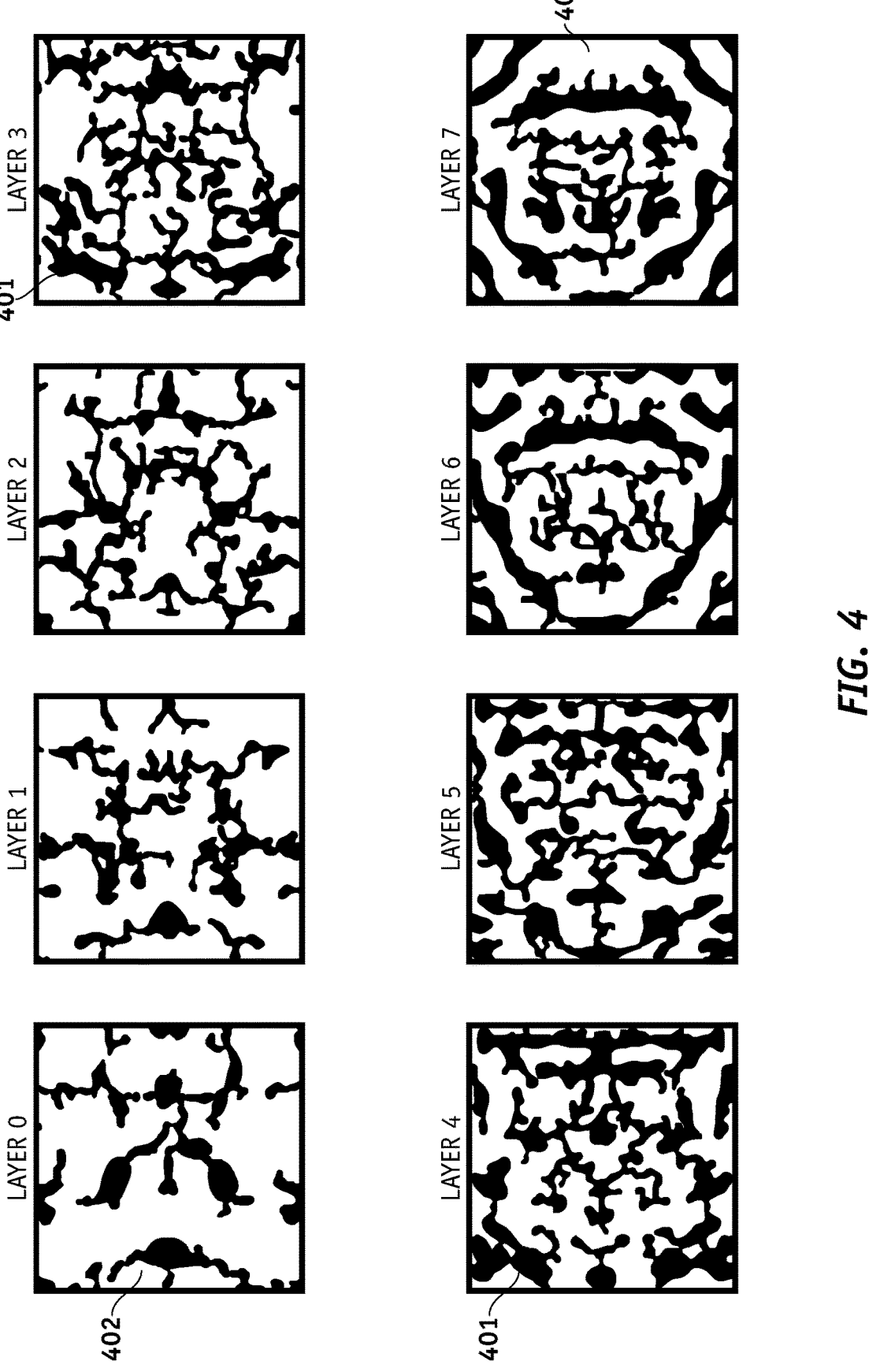
FIG. 4 shows exemplary layers in a multi-layer design according to an embodiment of the present disclosure.

As mentioned previously, the disclosed angular momentum splitters are formed based on a 3D pattern which is defined by structuring of the refractive index of the splitter and depending on the desired objective/cost function. On way to manufacture such splitters is to use a layered-approach where three-dimensional devices are constructed through repeated material deposition and patterning. In other words, the device may be structured by stacking a plurality of layers on top of one another. The fabrication process may be CMOS-compatible wherein the fabrication constraints may be directly incorporated with the design algorithm. Each layer may be produced using lithography. FIG. 4 illustrates the multi-layer concepts by showing the different layers of an exemplary 8-layer design. In this exemplary design, each layer may be, for example, 30.15 um×30.15 um×2.4 um and there are 8 layers, so the total device dimensions are 30.15 um×30.15 um×19.2 um. The dark regions (402) may be made of a material with, for example, and approximate index of refraction of 1.5 and the light regions may be vacuum (with a refractive index of 1), or any other material with a refractive index smaller than that of the material shown by dark regions (401).

With further reference to FIG. 4, by scaling the dimensions of the device, it can be made to work at any center wavelength provided adequate fabrication tolerances and the availability of a material at that wavelength with the same index of refraction. Another approach for getting the device to work in other wavelength regimes is to re-design it around different aspect ratios, fabrication tolerances, and material refractive indices using the same procedure outlined above.

The disclosed devices and methods offer several benefits over the existing solutions. The compact size of such devices allows for their seamless tiling alongside one another, catering to a range of applications. The inventors have successfully manufactured devices with sizes and spacing as small as 7 times the operational wavelength, encompassing wavelengths in the single-digit micrometer range. These devices can be designed to be directly integrated onto a rectangular grid of photodetectors, facilitating easy integration with standard imaging sensors. Moreover, the described devices offer a high degree of customization in terms of angular momentum states and polarizations, granting flexibility to tailor their functionality. Additionally, the disclosed devices offer further applicability and adaptability by enabling customization for various geometries, including fiber tips.

All references [1 through 5] disclosed in the presented specification and shown below are incorporated herein by reference in their entirety.

REFERENCES

1. Wang, J., Yang, J. Y., Fazal, I. M., Ahmed, N., Yan, Y., Huang, H., . . . & Willner, A. E. (2012). Terabit free-space data transmission employing orbital angular momentum multiplexing. Nature photonics, 6(7), 488-496.
2. Allen, L., Beijersbergen, M. W., Spreeuw, R. J. C., & Woerdman, J. P. (1992). Orbital angular momentum of light and the transformation of Laguerre-Gaussian laser modes. Physical review A, 45(11), 8185.
3. Willner, A. E., Pang, K., Song, H., Zou, K., & Zhou, H. (2021). Orbital angular momentum of light for communications. Applied Physics Reviews, 8(4), 041312.
4. Ren, H., Li, X., Zhang, Q., & Gu, M. (2016). On-chip noninterference angular momentum multiplexing of broadband light. Science, 352(6287), 805-809.
5. Bozinovic, N., Yue, Y., Ren, Y., Tur, M., Kristensen, P., Huang, H., . . . & Ramachandran, S. (2013). Terabit-scale orbital angular momentum mode division multiplexing in fibers. science, 340(6140), 1545-1548.

What is claimed is:

1. An optical arrangement comprising:
   a focal plane;
   a three-dimensional (3D) angular momentum splitter configured to:
   split an incident electromagnetic wave along optical states, the optical states including a plurality of angular momentum states, focus the split electromagnetic wave onto target areas corresponding to the plurality of angular momentum states, the target areas being on the focal plane, and
wherein the 3D angular momentum splitter is made by patterning a 3D volume in accordance with a set pattern calculated by an optimization algorithm used to optimize one or more figures of merit, and wherein the one or more figures of merit are defined based on the plurality of angular momentum states.

2. The optical arrangement of claim 1, wherein a resolution of the patterning is less than a wavelength of the incident electromagnetic wave.

3. The optical arrangement of claim 1, wherein, based on the set pattern, a refractive index of the angular momentum splitter is structured to form the 3D angular momentum splitter into a single block of a first material with interstices.

4. The optical arrangement of claim 3, wherein interstices of the 3D angular momentum splitter are filled with air or a second material with a refractive index less than a refractive index of the first material.

5. The optical arrangement of claim 1, wherein the optical states further include two additional polarization states that are orthogonal to each other.

6. The optical arrangement of claim 5, wherein the two additional polarization states include either a circular polarization or a linear polarization.

7. The optical arrangement of claim 1, further comprising a sensor array, the sensor array including a plurality of pixels aligned with the focal plane in correspondence with the target areas.

8. The optical arrangement of claim 7, further comprising a processing unit connected with the sensor array to process information from the split electromagnetic wave received from the sensor array pixels.

9. An imaging system comprising the optical arrangement of claim 8, wherein the incident electromagnetic wave is generated from an input light hitting an object and undergoing a reflection.

10. The imaging system of claim 9, further comprising an optical block including a beamsplitter and lenses, the optical block being configured to guide the input light to the object and the incident electromagnetic wave to the 3D angular momentum splitter.

11. The optical arrangement of claim 1, wherein a refractive index of the 3D angular momentum splitter is iteratively updated by the optimization algorithm and based on a sensitivity of a figure of merit to the one or more figures of merit with respect to said refractive index.

12. The optical arrangement of claim 11, wherein the optimization algorithm employs a gradient-descent method.

13. The optical arrangement of claim 1, wherein the one or more figures of merit include a contrast or an intensity of a wave focused on a corresponding target area.

14. A fiber communication system including one or more of the optical arrangement of claim 1 disposed on a transmitter or a receiver side.

15. A camera comprising the optical arrangement of claim 1.

* * * * *